(12) United States Patent
Skagmo et al.

(10) Patent No.: US 12,731,967 B2
(45) Date of Patent: Sep. 8, 2026

(54) METAL ENCLOSURE FOR ELECTRICAL SWITCHGEAR

(71) Applicant: ABB Schweiz AG, Baden (CH)

(72) Inventors: Dag Erik Skagmo, Svarstad (NO); Terje Thingstad Pettersen, Skien (NO); Magnus Bjerkely, Porsgrunn (NO)

(73) Assignee: ABB SCHWEIZ AG, Baden (CH)

( * ) Notice: Subject to any disclaimer, the term of this patent is extended or adjusted under 35 U.S.C. 154(b) by 172 days.

(21) Appl. No.: 18/748,615

(22) Filed: Jun. 20, 2024

(65) Prior Publication Data

US 2025/0007254 A1 Jan. 2, 2025

(30) Foreign Application Priority Data

Jun. 30, 2023 (EP) .................................... 23182652

(51) Int. Cl.
*H02B 13/02* (2006.01)
*H02B 13/045* (2006.01)

(52) U.S. Cl.
CPC .................................. *H02B 13/045* (2013.01)

(58) Field of Classification Search
None
See application file for complete search history.

(56) References Cited

U.S. PATENT DOCUMENTS 9,608,414 B2 * 3/2017 Pellicano ................. H02B 1/36
10,224,699 B2 * 3/2019 Leber ...................... H01F 27/02
10,263,401 B2 4/2019 Yamada et al.
2009/0317698 A1 * 12/2009 Murata ............. H01M 8/04074 361/689
2021/0167411 A1 * 6/2021 Hanafusa .............. H01M 8/188
(Continued)

FOREIGN PATENT DOCUMENTS

CN 110970271 A * 4/2020 ............. H01H 33/53
CN 214379718 U 10/2021
(Continued)

OTHER PUBLICATIONS

Extended European Search Report; Application No. 23182652.0; Completed: Nov. 29, 2023; Mailing Date: Dec. 8, 2023; 10 Pages.

*Primary Examiner* — Courtney L Smith
(74) *Attorney, Agent, or Firm* — Greenberg Traurig, LLP

(57) ABSTRACT

A metal enclosure for electrical switchgear, the metal enclosure is configured to be pressurized above atmospheric pressure, the metal enclosure having: metal walls sealing a volume for accommodating the electrical switchgear, the metal walls including a first metal wall arranged opposite a second metal wall, wherein at least the second metal wall is a corrugated metal plate with corrugations that extend along a first axis, a set of elongated metal elements attached to the first metal wall and to the second metal wall, the elongated metal elements are arranged through holes in the first metal wall and in the second metal wall and reach outside the metal enclosure, a set of elongated metal stiffeners attached to a rear side of the second metal wall outside the metal enclosure, each of the metal stiffeners is attached to at least two of the corrugations of the second metal wall, wherein each metal stiffener is attached to at least one of the elongated metal elements.

20 Claims, 5 Drawing Sheets

(56) References Cited

U.S. PATENT DOCUMENTS

| | | | | |
|---|---|---|---|---|
| 2022/0046814 | A1* | 2/2022 | Bier | H02B 1/28 |
| 2022/0200251 | A1* | 6/2022 | Gentils | H02B 13/045 |

FOREIGN PATENT DOCUMENTS

| | | | | | |
|---|---|---|---|---|---|
| CN | 113948996 | A | | 1/2022 | |
| CN | 119093204 | A | * | 12/2024 | H02B 1/32 |
| DE | 102005009207 | A1 | * | 8/2006 | H02B 13/02 |
| EP | 3483995 | A1 | | 5/2019 | |
| WO | 2019096711 | A1 | | 5/2019 | |

* cited by examiner

METAL ENCLOSURE FOR ELECTRICAL SWITCHGEAR

TECHNICAL FIELD

The present invention relates to a metal enclosure for electrical switchgear.

BACKGROUND

Metal enclosures for gas-insulated switchgear encapsulated the switchgear in a pressurized environment. The gas is selected to provide electrical insulation inside the metal enclosure and typical gas is SF6 although other gases are also applicable such as dry air, N2, CO2 or mixture of two or three of N2, O2, CO2.

The dielectric withstand of the gas is proportional to the pressure inside the metal enclosure. Thus, it is advantageous to increase the pressure of the gas inside the metal enclosure. However, this means that the metal enclosure walls must be able to withstand the forces from the increased pressure.

Therefore, it is desirable to improve the ability for metal enclosures for gas-insulated switchgear to withstand higher pressures as is set out in more detail below.

SUMMARY

In view of the above-mentioned and other drawbacks of the prior art, it is an object of the present invention to provide a metal enclosure that at least partly alleviates the deficiencies with prior art.

According to a first aspect of the invention, there is provided a metal enclosure for electrical switchgear, the metal enclosure is configured to be pressurized above atmospheric pressure, the metal enclosure comprising: metal walls sealing a volume for accommodating the electrical switchgear, the metal walls including a first metal wall arranged opposite a second metal wall, wherein at least the second metal wall is a corrugated metal plate with corrugations that extend along a first axis, a set of elongated metal elements attached to the first metal wall and to the second metal wall, the elongated metal elements are arranged through holes in the first metal wall and in the second metal wall and reach outside the metal enclosure, a set of elongated metal stiffeners attached to a rear side of the second metal wall outside the metal enclosure, each of the metal stiffeners is attached to at least two of the corrugations of the second metal wall, wherein each metal stiffener is attached to at least one of the elongated metal elements.

The present invention is at least partly based on the realization of elongated metal elements that reach between the oppositely arranged first and second metal walls and that are attached to elongated metal stiffeners on the rear side of the second metal wall. Thus, the elongated metal elements penetrate through the second metal wall so that they can be attached to the stiffeners outside the metal enclosure. The connection between oppositely arranged walls provided by the elongated metal elements increase the ability for the metal enclosure to withstand pressure, and the connection to the stiffeners distribute the forces across the corrugations of the walls.

To withstand higher pressures is particularly important when moving to using dry air, N2, CO2 or a mixture of any two or three of N2, O2, CO2 as the dielectric gas. These gases require higher pressures to provide adequate insulation without increasing the distance between switchgear phases and components compared to more environmental unfriendly alternatives such as SF6. It is desirable to maintain a size, or at least not increase the size of the metal enclosures despite moving to different gases.

Generally, in electrification and gas insulated switchgear (GIS), if the pressure of gas in the metal enclosure exceeds 1.5 bar abs, then the enclosure may be known as a high-pressure enclosure based on known standards. If so, then it has to pass a related pressure routine test and it has made the traditional enclosures heavy and quite expensive. Therefore, the filling pressure of medium voltage (MV)-GIS as is herein discussed is traditionally <1.5 bar abs, e.g., in range 1.0-1.5 bar abs. Advantageously, the herein disclosed metal enclosure is suitable for filling pressure of 1.0-4.0 bar abs, preferably for 1.5-3.0 bar abs. In other words, an increased pressure compared to the traditional range of 1.0-1.5 bar abs without the need for heavy and excessively large enclosure walls.

According to an embodiment, each metal stiffener may be attached to all corrugations of the second metal wall. This increases the pressure withstand of the metal enclosure further.

According to an embodiment, the metal stiffeners may be elongated plates arranged along an axis that lies at an angle with respect to the axis of the corrugations. The corrugations generally have a longitudinal axis along the valleys or ridges of the corrugations. To increase the pressure withstand even further the main axis of the elongated metal stiffeners may be at an angle to the axis of the corrugations. The angle is such that the metal stiffeners are not parallel with the axis of the corrugations.

According to an embodiment, the angle may be about 90°.

According to an embodiment, the elongated metal elements may be attached to the rear side of the second metal wall and to a rear side of the first metal wall. Distributing the forces to the rear sides, where the stiffeners are located increases the pressure withstand of the metal enclosure further.

According to an embodiment, the elongated metal elements may be attached to the first metal wall and to the second metal wall by welding. Welding provides a strong anchoring of the elongated metal elements to the metal walls.

According to an embodiment, the metal stiffeners may be attached to the second metal wall by welding. Welding provides a strong anchoring of the metal stiffeners to the metal walls.

According to an embodiment, the metal enclosure may comprise a set of elongated metal stiffeners attached to a rear side of the first metal wall outside the metal enclosure, each of the metal stiffeners is attached to at least one of the elongated metal elements. Using more than one metal stiffener advantageously distributes the forces across a larger area and consequently increases the pressure withstand further.

A rear side is herein generally an outward facing side of the walls. That is, the rear side faces to the outside of the metal enclosure opposite to the volume that the enclosure encompasses.

According to an embodiment, the set of elongated metal stiffeners attached to the first metal wall may be substantially parallel with the elongated metal stiffeners attached to the second metal wall.

According to an embodiment, the metal enclosure may comprise a third metal wall connected with both the first metal wall and the second metal wall, the third metal wall comprising corrugations and a set of elongated metal elements each attached to at least to corrugations. In this way, the third metal wall, which may be a top wall, is also adapted to withstand higher pressures inside the metal enclosure, thereby increasing the overall pressure withstand of the metal enclosure.

According to an embodiment, the elongated metal stiffeners on the second metal wall may comprise cut-outs corresponding shape of the corrugations of the second metal wall. Thus, the contact interface between the metal stiffeners and the second metal wall follows the shape of the corrugations thereby increasing the strength of the connection between metal stiffeners and the second metal wall.

According to an embodiment, wherein the elongated metal elements may be metal rods.

According to an embodiment, wherein the rods may comprise longitudinal cuts at their end portions, wherein the elongated metal stiffeners may be fitted and attached in the cuts. In this way, the strength of the connection between the rods and the stiffeners are increased. The metal stiffeners may be welded to the rods in the cuts. A longitudinal cut is a cut along the longitudinal axis of the rod.

Alternatively, the metal stiffeners may comprise cuts, wherein the rods are fitted and attached in the cuts.

According to an embodiment, the walls of the metal enclosure may be made from steel. Steel provides a strong material that can increase the ability for the metal enclosure to withstand the internal pressure.

In a second aspect of the present invention, there is provided a gas insulated switchgear comprising: a set of electrical switches; and a metal enclosure according to any one of the herein disclosed embodiments.

Further effects and features of the second aspect of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1:
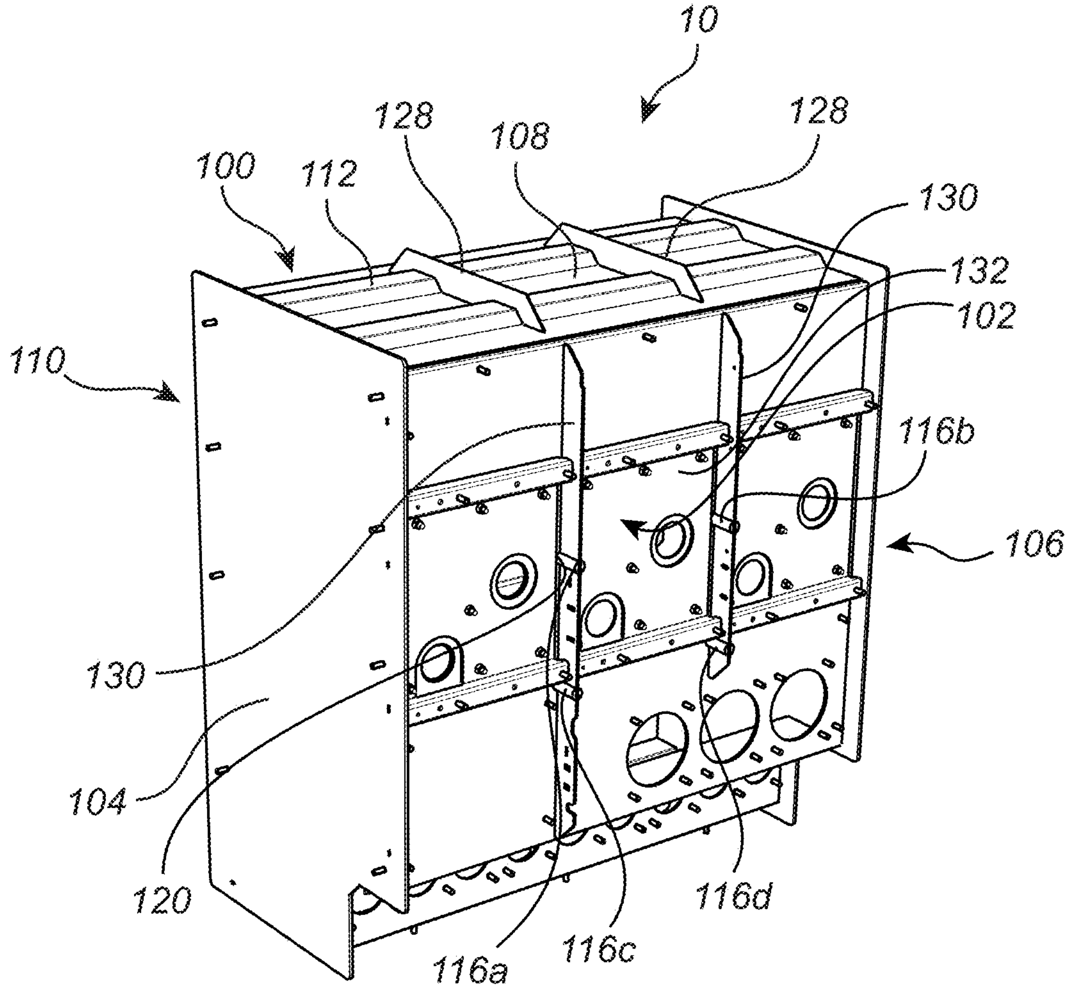
FIG. 1 is a perspective view of a front side of a metal enclosure according to embodiments of the invention.
Figure 2:
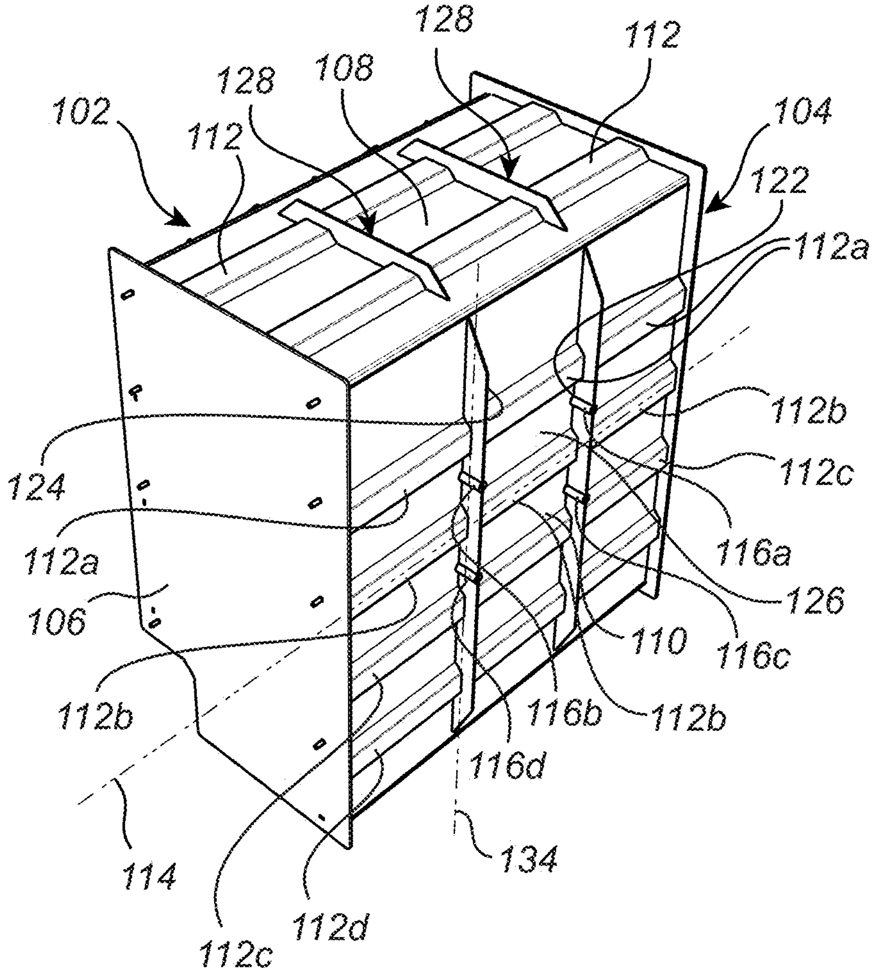
FIG. 2 is a perspective view of a rear side of a metal enclosure according to embodiments of the invention.

FIG. 1 illustrates a front view and FIG. 2 illustrates a rear view of a metal enclosure 100 for electrical switchgear. The metal enclosure 100 is configured to be pressurized above atmospheric pressure.

The metal enclosure 100 comprises metal walls 102, 104, 106, 108, 110 sealing a volume for accommodating the electrical switchgear.

The metal walls including a first metal wall 102 arranged opposite a second metal wall 110, better seen in FIG. 2. The second metal wall 110 is a corrugated metal plate with corrugations 112*a-d* that extend along a first axis 114.

The metal plate 110 comprises a set of parallel corrugations 112*a-d*, formed as ridges, that all extend in parallel with the same longitudinal first axis 114.

Furthermore, the third wall 108 provided as a metal plate at the top side of the metal enclosure 100 is connected with both the first metal wall 102 and the second metal wall 110 for example by welding. The third metal wall 108 comprises corrugations 112 that are parallel with the corrugations 112*a-d* of the second metal wall 110.

The side walls 106 and 104 are attached to the first 102, second 110, and the third metal wall 108 with sealed connections. The metal walls 102, 104, 106, 108, 110 may be metal plates. In one embodiment, the walls 102, 104, 106, 108, 110 of the metal enclosure 100 are made from steel.

A set of elongated metal elements 116*a-d* attached to the first metal wall 102 and to the second metal wall 110. The elongated metal elements 116*a-d* are arranged through holes 120, 122 in the first metal wall 102 and in the second metal wall 110, respectively. The elongated metal elements 116*a-d* reach outside the metal enclosure 100.

Furthermore, a set of elongated metal stiffeners 124 attached to a rear side 126 of the second metal wall 110 outside the metal enclosure 100. Each of the metal stiffeners 124 is attached to at least two of the corrugations 112 of the second metal wall 110. Moreover, each metal stiffener 124 is attached to at least one of the elongated metal elements 116*a-d*.

The corrugations 112*a-d* reach from side wall 106 to side wall 104 but are overlaid by the metal stiffeners 124. Preferably, the metal stiffeners 124 may have cutouts to allow the corrugations to be arranged under the metal stiffeners. Alternatively, the metal stiffeners may cut through the corrugations.

In this embodiment, a set of elongated metal stiffeners 128 are each attached to at least two corrugations of the top plate 108. In addition, elongated metal stiffeners 130 may be attached to the outer side 132 of the first metal wall 102. The set of elongated metal stiffeners 130 attached to the first metal wall 102 are substantially parallel with the elongated metal stiffeners 124 attached to the second metal wall 110.

The metal stiffeners 124, 128, 130 may be elongated metal plates that are attached to all corrugations of the respective wall 102, 108, 110. For example, the metal stiffeners 124 reach across and interrupt all the corrugations 112*a-d* of the second metal wall 110.

The main axis 134 of the elongated metal stiffeners 124 lies at an angle with respect to the axis 114 of the corrugations being such that the axes 134 and 114 are not parallel. Preferably, the angle is about 90°. That is, the metal stiffeners 124 are transversal to the corrugations 112*a-d*.

Figure 3:
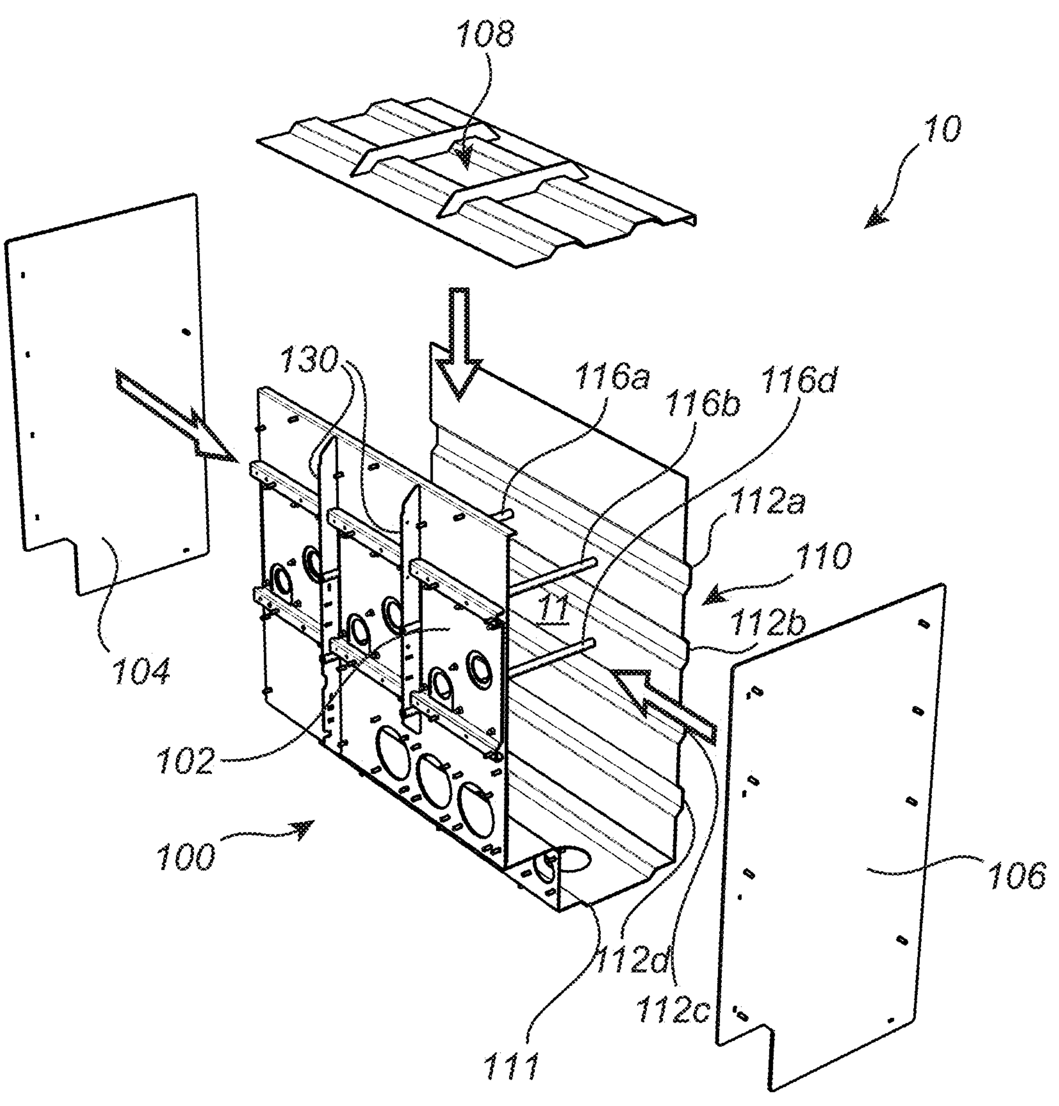
FIG. 3 an exploded view of a metal enclosure according to embodiments of the invention.

FIG. 3 is an exploded view of the metal enclosure 100. The elongated metal elements 116*a-d* reach all the way between the first metal wall 102 and the second metal wall 110. Further, the corrugations, of which 112*a* is best seen, reach from side to side between side walls 104 and 106.

The metal enclosure 100 may be comprised in a gas insulated switchgear 10 comprising a set of electrical switches 11 adapted for operation at 10-52 kV, preferably 12/24/36, 40.5 kV, and may have a modular construction regarding the combinations of switches that can be assembled in sequence inside the metal gas enclosure 100. The switches may for example be e.g. CC, CCV, CCF, CCCC etc., where C: Cable switch module, De: Direct cable connection with earthing module, D: Direct cable connection module, F: Switch-fuse disconnector module, V: Vacuum circuit-breaker module.

By utilizing the space in-between the switches/breakers by inserting rods 116*a-d* with stiffeners 130, 124 the strength of the front 102 and back 110 is achieved. The strengthening follows the amount of switches/breakers in combination and will keep the stiffening properties no matter the amount of switches/breakers. To further improve the stiffening the top 108, bottom plate 111 and backplates 110 are corrugated.

Figure 4:
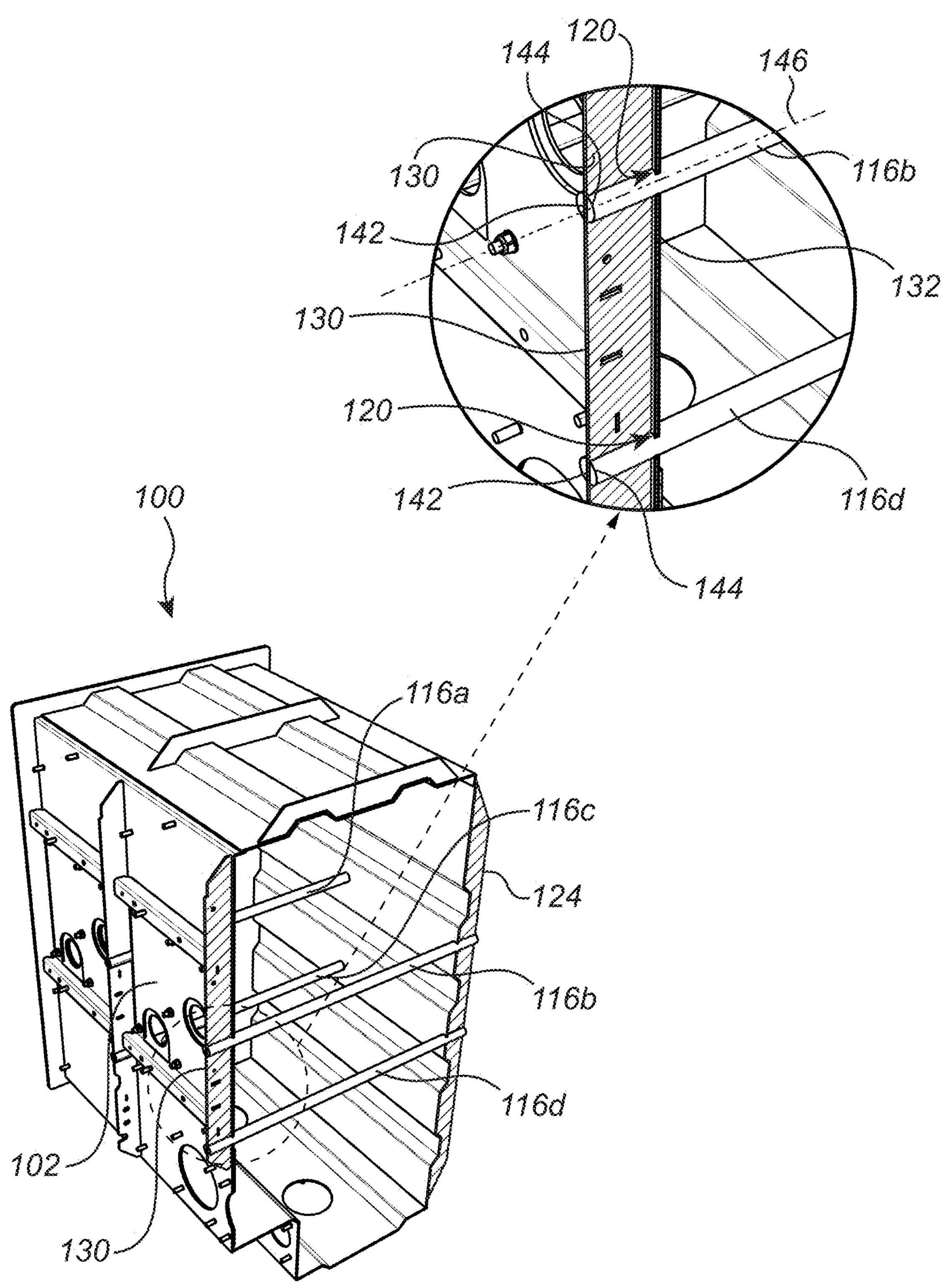
FIG. 4 is a cross-section of a metal enclosure according to embodiments of the invention.
Figure 5:
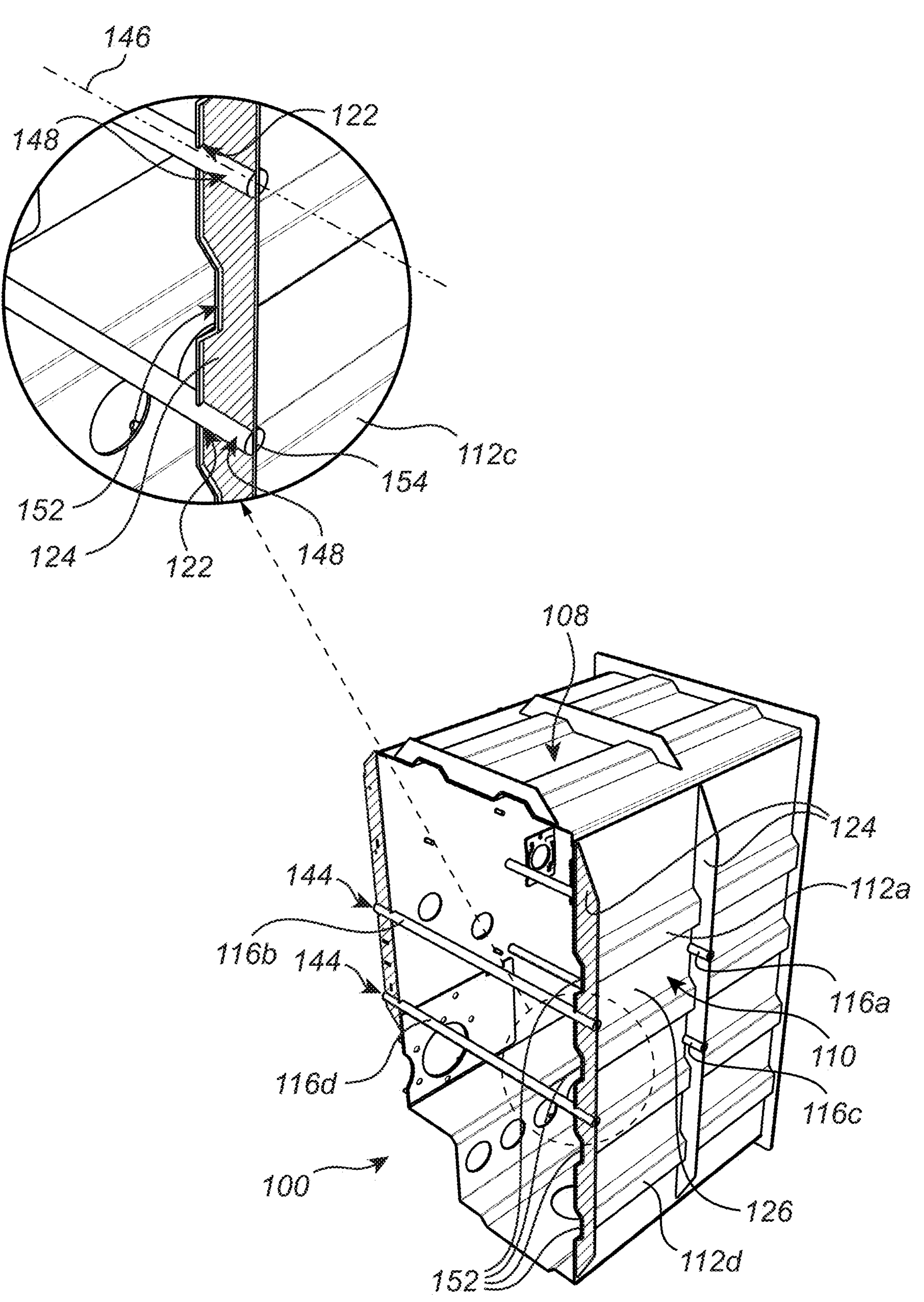
FIG. 5 is a cross-section of a metal enclosure according to embodiments of the invention.

FIG. 4 and FIG. 5 are cross-sections of the metal enclosure 100 from two different perspectives. The perspective in FIG. 4 is from the side of the front wall, the first metal wall 102 and the perspective in FIG. 5 is from the side of the rear wall 110, the second metal wall 110.

First with reference to FIG. 4, the elongated metal elements 116*a-d*, provided as rods are attached to the rear side 132 of the first metal wall 102. For this, the rods 116*a-d* are fed through through-holes 120 in the first metal wall 102 and welded to the first metal wall 102. Furthermore, the metal stiffeners 130 are also welded to the first metal wall along the contact interface between the metal stiffener and the rear side 132 of the first metal wall 102.

To improve the connection between the rods 116*a-d* and the stiffeners 130, the rods 116*a-d* comprise longitudinal cuts 142 at their end portions 144 which extend outside the metal enclosure 100 away from the rear side 132 of the first metal wall 102. The cuts 142 are along the respective longitudinal axis 146 of the rods 116*a-d*. The metal stiffeners 130 are arranged in the cuts 142 where they are welded to be fixed to the respective rods 116*a-d*.

In this embodiment, the rods 116*b*, 116*d* are welded to one metal stiffener 130 on the first metal wall 102. The metal stiffener 130 is fitted in the cuts 142 at the ends 144 of the rods 116*b*, 116*d*. The other rods 116*a*, 116*c* are welded to another metal stiffener 130 which is fitted in the cuts 142 of the rods 116*a*, 116*c*.

Welds are made along the interface of the metal stiffeners 130 and the rods 116*a-d* along the cuts 142 on both sides, e.g., rod halves, of the cuts 142.

Turning now to FIG. 5 which is a perspective from the second metal wall 110. The rods 116*a-d* are attached to the rear side 126 of the second metal wall 110.

The end portions 148 of the rods 116*a-d* are fed through through-holes 122 in the second metal wall 110 and welded thereto. The end portions 148 are on the opposite end of the rods 116*a-d* with respect to the ends portions 144 attached to the first metal wall 102.

Furthermore, the metal stiffeners 124 are welded to the second metal wall 110 along the contact interface between the metal stiffener 124 and the rear side 126 of the second metal wall 110. The metal stiffeners 124 comprises cut-outs 152 to accommodate the corrugations 112*a-c*. Preferably, the shape of the cut-outs 152 corresponds to the shape of the corrugations 112*a-d* of the second metal wall 110. The second metal wall 110 with its corrugations 112*a-d* may be made in a single piece.

To improve the connection between the rods 116*a-d* and the stiffeners 124, the rods 116*a-d* comprise longitudinal cuts 154 at their end portions 148. The end portions 148 extend outside the metal enclosure 100 away from the rear side 126 of the second metal wall 110.

The cuts 154 are along the respective longitudinal axis 146 of the rods 116*a-d* in the same way as the cuts 154 on the opposite end 144. The metal stiffeners 126 are arranged in the cuts 154 where they are welded to be fixed to the respective rods 116*a-d*.

The rods 116*b*, 116*d* are welded to one metal stiffener 124 on the second metal wall 110. The metal stiffener 124 is fitted in the cuts 154 at the ends 154 of the rods 116*b*, 116*d*. The other two rods 116*a*, 116*c* are welded to another metal stiffener 124 which is fitted in the cuts 154 of the rods 116*a*, 116*c*.

Welds are made along the interface of the metal stiffeners 124 and the rods 116*a-d* along the cuts 154 on both sides, e.g., rod halves, of the cuts 142. The cuts may be made in the center of the rod so that the cut splits the end portion 144, 148 in half.

Alternatively, the metal stiffeners may comprise cuts, wherein the rods are fitted and attached in the cuts.

Although four rods 116*a-d* are shown in the drawings, the number of rods depends on the specific implementation at hand and may thus be more than four or less than four. Similarly, the number of corrugations, here being four, are shown as an example and may vary depending on implementation.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A metal enclosure for electrical switchgear, the metal enclosure is configured to be pressurized above atmospheric pressure, the metal enclosure comprising:

metal walls sealing a volume for accommodating the electrical switchgear, the metal walls including a first metal wall arranged opposite a second metal wall, wherein at least the second metal wall is a corrugated metal plate with corrugations that extend along a first axis, a set of elongated metal elements attached to the first metal wall and to the second metal wall, the set of elongated metal elements are arranged through holes in the first metal wall and in the second metal wall and reach outside the metal enclosure, and a set of elongated metal stiffeners attached to a rear side of the second metal wall outside the metal enclosure, each elongated metal stiffener of the set of elongated metal stiffeners is attached to at least two of the corrugations of the second metal wall, wherein each metal stiffener is attached to at least one elongated metal element of the set of elongated metal elements.

2. The metal enclosure according to claim 1, wherein each elongated metal stiffener is attached to all corrugations of the second metal wall.

3. The metal enclosure according to claim 1, wherein the set of elongated metal stiffeners are elongated plates arranged along an axis that lies at an angle with respect to the axis of the corrugations.

4. The metal enclosure according to claim 3, wherein the angle is about 90°.

5. The metal enclosure according to claim 1, wherein the set of elongated metal elements are attached to the rear side of the second metal wall and to a rear side of the first metal wall.

6. The metal enclosure according to claim 1, wherein the set of elongated metal elements are attached to the first metal wall and to the second metal wall by welding.

7. The metal enclosure according to claim 1, wherein the set of elongated metal stiffeners are attached to the second metal wall by welding.

8. The metal enclosure according to claim 1, wherein the set of elongated metal stiffeners is a first set of elongated metal stiffeners, and comprising a second set of elongated metal stiffeners attached to a rear side of the first metal wall outside the metal enclosure, each elongated metal stiffener of the second set of elongated metal stiffeners is attached to at least one elongated metal element of the set of elongated metal elements.

9. The metal enclosure according to claim 8, wherein the second set of elongated metal stiffeners attached to the first metal wall are substantially parallel with the first set of elongated metal stiffeners attached to the second metal wall.

10. The metal enclosure according to claim 1, comprising a third metal wall connected with both the first metal wall and the second metal wall, the third metal wall having corrugations and a corresponding set of elongated metal stiffeners each attached to at least two corrugations.

11. The metal enclosure according to claim 1, wherein the set of elongated metal stiffeners on the second metal wall comprises cut-outs corresponding to the shape of the corrugations of the second metal wall.

12. The metal enclosure according to claim 1, wherein the set of elongated metal elements are metal rods.

13. The metal enclosure according to claim 12, wherein the metal rods comprise longitudinal cuts at their end portions, wherein the set of elongated metal stiffeners are fitted and attached in the longitudinal cuts, or wherein the set of elongated metal stiffeners have cuts, where the metal rods are fitted and attached in the cuts.

14. The metal enclosure according to claim 1, wherein the metal walls of the metal enclosure are made from steel.

15. A gas insulated switchgear comprising:

a set of electrical switches; and a metal enclosure configured to be pressurized above atmospheric pressure, the metal enclosure having:

metal walls sealing a volume for accommodating the gas insulated switchgear, the metal walls including a first metal wall arranged opposite a second metal wall, wherein at least the second metal wall is a corrugated metal plate with corrugations that extend along a first axis, a set of elongated metal elements attached to the first metal wall and to the second metal wall, the set of elongated metal elements are arranged through holes in the first metal wall and in the second metal wall and reach outside the metal enclosure, and a set of elongated metal stiffeners attached to a rear side of the second metal wall outside the metal enclosure, each elongated metal stiffener of the set of elongated metal stiffeners is attached to at least two of the corrugations of the second metal wall, wherein each elongated metal stiffener is attached to at least one elongated metal element of the set of elongated metal elements pressurized by a gas.

16. The metal enclosure according to claim 2, wherein the set of elongated metal stiffeners are elongated plates arranged along an axis that lies at an angle with respect to the axis of the corrugations.

17. The metal enclosure according to claim 2, wherein the set of elongated metal elements are attached to the rear side of the second metal wall and to a rear side of the first metal wall.

18. The metal enclosure according to claim 2, wherein the set of elongated metal elements are attached to the first metal wall and to the second metal wall by welding.

19. The metal enclosure according to claim 2, wherein the set of elongated metal stiffeners are attached to the second metal wall by welding.

20. The metal enclosure according to claim 2, wherein the set of elongated metal stiffeners is a first set of elongated metal stiffeners, and comprising a second set of elongated metal stiffeners attached to a rear side of the first metal wall outside the metal enclosure, each elongated metal stiffener of the second set of elongated metal stiffeners is attached to at least one elongated metal element of the set of elongated metal elements.

* * * * *